United States Patent
Noh et al.

(10) Patent No.: US 9,722,246 B2
(45) Date of Patent: Aug. 1, 2017

(54) METHOD OF PREPARING INORGANIC PARTICLES AND INORGANIC PARTICLES PREPARED USING THE SAME

(71) Applicant: LG Chem, Ltd., Seoul (KR)

(72) Inventors: Hyun Kuk Noh, Daejeon (KR); Hong Kyu Park, Daejeon (KR); Ji Hoon Ryu, Daejeon (KR); Wang Mo Jung, Daejeon (KR); Sang Seung Oh, Daejeon (KR); Chi Ho Jo, Daejeon (KR)

(73) Assignee: LG Chem, Ltd. (KR)

( * ) Notice: Subject to any disclaimer, the term of this patent is extended or adjusted under 35 U.S.C. 154(b) by 97 days.

(21) Appl. No.: 14/440,202

(22) PCT Filed: Nov. 26, 2013

(86) PCT No.: PCT/KR2013/010785
§ 371 (c)(1),
(2) Date: May 1, 2015

(87) PCT Pub. No.: WO2014/081268
PCT Pub. Date: May 30, 2014

(65) Prior Publication Data
US 2015/0318548 A1    Nov. 5, 2015

(30) Foreign Application Priority Data
Nov. 26, 2012   (KR) .................. 10-2012-0134230

(51) Int. Cl.
*C01B 25/00* (2006.01)
*H01M 4/00* (2006.01)
(Continued)

(52) U.S. Cl.
CPC ........... *H01M 4/5825* (2013.01); *C01B 25/45* (2013.01); *H01M 4/049* (2013.01); *H01M 4/366* (2013.01);
(Continued)

(58) Field of Classification Search
CPC .... H01M 4/5825; H01M 4/049; H01M 4/366; H01M 4/0471; H01M 4/625;
(Continued)

(56) References Cited

U.S. PATENT DOCUMENTS 6,440,337 B1 * 8/2002 Hanna .................. A61K 9/1688
264/11
2009/0081100 A1    3/2009 Suzuki et al.
(Continued)

FOREIGN PATENT DOCUMENTS

CN    102263246 A     11/2011
CN    102491302 A  *  6/2012
(Continued)

OTHER PUBLICATIONS

International Search Report for Application No. PCT/KR2013/010785 dated Mar. 6, 2014.

*Primary Examiner* — Harold Pyon
*Assistant Examiner* — Danny N Kang
(74) *Attorney, Agent, or Firm* — Lerner, David, Littenberg, Krumholz & Mentlik, LLP (57) ABSTRACT

Disclosed is a method of preparing inorganic particles using a hydrothermal synthesis device, including introducing a precursor liquid or slurry stream including a reaction precursor for preparation of an inorganic material into a hydrothermal synthesis reactor, introducing a supercritical liquid stream including water into the hydrothermal synthesis reactor, preparing an inorganic slurry by hydrothermal reaction in the hydrothermal synthesis reactor and discharging
(Continued)

the inorganic slurry therefrom, and filtering the discharged inorganic slurry, wherein the precursor liquid or slurry stream includes an $NH_3$ source at a high temperature of the supercritical liquid stream and thus clogging of the stream in the hydrothermal synthesis reactor is inhibited by pH changes in the hydrothermal reaction.

23 Claims, 3 Drawing Sheets

(51) Int. Cl.
*H01M 4/58* (2010.01)
*C01B 25/45* (2006.01)
*H01M 4/36* (2006.01)
*H01M 4/04* (2006.01)
*H01M 4/02* (2006.01)
*H01M 4/62* (2006.01)

(52) U.S. Cl.
CPC ....... *C01P 2006/40* (2013.01); *H01M 4/0471* (2013.01); *H01M 4/625* (2013.01); *H01M 2004/028* (2013.01); *Y02P 20/544* (2015.11)

(58) Field of Classification Search
CPC    H01M 2004/028; C01B 25/45; Y02P 20/544; C01P 2006/40
USPC .......................................................... 252/500
See application file for complete search history.

(56) References Cited

U.S. PATENT DOCUMENTS

2010/0261060 A1* 10/2010 Choy .................... C01B 25/45
                                                      429/221
2013/0129596 A1   5/2013 Noh et al.

FOREIGN PATENT DOCUMENTS

| JP | 2001163700 A | * | 6/2001 |
| JP | 2002102672 A |   | 4/2002 |
| JP | 2010069474 A |   | 4/2010 |
| KR | 20120015278 A |  | 2/2012 |

* cited by examiner

METHOD OF PREPARING INORGANIC PARTICLES AND INORGANIC PARTICLES PREPARED USING THE SAME

CROSS-REFERENCE TO RELATED APPLICATION

This application is a national phase entry under 35 U.S.C. §371 of International Application No. PCT/KR2013/010785, filed Nov. 26, 2013, which claims priority to Korean Patent Application No. 10-2012-0134230, filed Nov. 26, 2012, the disclosures of which are incorporated herein by reference.

TECHNICAL FIELD

The present invention relates to a method of preparing inorganic particles by using a hydrothermal synthesis device, including: (a) introducing a precursor liquid or slurry stream including a reaction precursor for preparation of an inorganic material into a hydrothermal synthesis reactor; (b) introducing a supercritical liquid stream containing water into the hydrothermal synthesis reactor; (c) preparing an inorganic slurry by hydrothermal reaction in the hydrothermal synthesis reactor and discharging the inorganic slurry therefrom; and (d) filtering the discharged inorganic slurry, wherein the precursor liquid or slurry stream includes an $NH_3$ source at a high temperature of the supercritical liquid stream and thus clogging of the stream in the hydrothermal synthesis reactor is inhibited by pH changes in the hydrothermal reaction.

BACKGROUND ART

Inorganic compounds are used as raw materials or final products in various fields and also used as raw materials of electrode active materials for secondary batteries, which have recently been increasingly used.

Lithium secondary batteries, which are a representative example of secondary batteries, generally use lithium cobalt oxide ($LiCoO_2$) as a cathode active material, a carbon material as an anode active material, and lithium hexafluorophosphate (($LiPF_6$)) as an electrolyte. As the cathode active materials, layered $LiCoO_2$, lithium nickel oxide ($LiNiO_2$), and spinel lithium manganese oxide ($LiMn_2O_4$), and the like are known, but $LiCoO_2$ is the most commonly used in commercial applications.

However, supply of cobalt as a main component is unstable and cobalt is expensive and thus materials, some cobalt atoms of which are substituted with a transition metal such as Ni, Mn, or the like, or spinel $LiMn_2O_4$ and the like which contain very little cobalt have begun to be commercially used. In addition, novel compounds with more stable structure even at high voltage or materials that are prepared by doping or coating existing cathode active materials with other metal oxides and thus have enhanced stability have been developed.

Among conventional methods of preparing cathode active materials, dry calcination and wet precipitation are mostly widely known methods. According to dry calcination, a cathode active material is prepared by mixing an oxide or hydroxide of a transition metal such as cobalt (Co) or the like with lithium carbonate or lithium hydroxide as a lithium source in a dried state and then calcining the resulting mixture at a high temperature of 700° C. to 1000° C. for 5 to 48 hours.

Dry calcination is, advantageously, a widely used technology for preparing metal oxides and thus is easy to approach, but is disadvantageous in that it is difficult to obtain single-phase products due to difficulties in uniform mixing of raw materials and, in the case of multi-component cathode active materials consisting of two or more transition metals, it is difficult to uniformly arrange at least two elements to atom levels. In addition, when a method of doping or substituting with particular metal components to improve electrochemical performance is used, it is difficult to uniformly mix the particular metal components added in small amounts and loss of the metal components inevitably occurs through pulverizing and sorting processes performed to obtain desired particle sizes.

Another conventional method of preparing cathode active materials is wet precipitation. In wet precipitation, a cathode active material is prepared by dissolving a salt containing a transition metal such as Co or the like in water, adding alkali to the solution to precipitate the transition metal in the form of transition metal hydroxide, filtering and drying the precipitate, mixing the resulting precipitate with lithium carbonate or lithium hydroxide as a lithium source in a dried state, and calcining the mixture at a high temperature of 700° C. to 1000° C. for 1 to 48 hours.

The wet precipitation method is known to easily obtain a uniform mixture by co-precipitating, in particular, two or more transition metal elements, but requires a long period of time in precipitation reaction, is complicated, and incurs generation of waste acids as by-products. In addition, various methods, such as a sol-gel method, a hydrothermal method, spray pyrolysis, an ion exchange method, and the like, have been used to prepare a cathode active material for lithium secondary batteries.

In addition to the methods described above, a method of preparing an inorganic compound for a cathode active material by hydrothermal synthesis using high-temperature and high-pressure water is used.

When hydrothermal synthesis is used, however, a portion at which a precursor liquid or slurry stream is introduced into a hydrothermal synthesis reactor is clogged.

Due to this problem, it is difficult to prepare inorganic particles using a continuous hydrothermal synthesis method. That is, a continuous operating time of a hydrothermal synthesis device is only about 1 week, and this method requires a large amount of labor and time in disassembly of a clogged reactor, cleaning of the inside of the reactor, and the like.

Therefore, there is a high need to develop a method of preparing inorganic particles by increasing a continuous operating time by minimizing clogging of an inlet, whereby productivity may be significantly increased and investment costs may be reduced.

DISCLOSURE

Technical Problem

Therefore, the present invention has been made to solve the above problems and other technical problems that have yet to be resolved.

As a result of a variety of intensive studies and various experiments, the inventors of the present invention confirmed that, as described below, when pH in a hydrothermal synthesis reactor is adjusted, surprisingly, clogging of the hydrothermal synthesis reactor may be minimized or completely prevented, thus completing the invention.

Technical Solution

In accordance with one aspect of the present invention, provided is a method of preparing inorganic particles by using a hydrothermal synthesis device, including:

(a) introducing a precursor liquid or slurry stream including a reaction precursor for preparation of an inorganic material into a hydrothermal synthesis reactor;

(b) introducing a supercritical liquid stream containing water into the hydrothermal synthesis reactor;

(c) preparing an inorganic slurry by hydrothermal reaction in the hydrothermal synthesis reactor and discharging the inorganic slurry therefrom; and (d) filtering the discharged inorganic slurry, wherein the precursor liquid or slurry stream includes an $NH_3$ source at a high temperature of the supercritical liquid stream and thus clogging of the stream in the hydrothermal synthesis reactor is inhibited by pH changes in the hydrothermal reaction.

In one exemplary embodiment, the hydrothermal synthesis device may include a structure in which a precursor liquid or slurry stream containing a precursor for preparation of an inorganic material, a supercritical liquid stream containing high-temperature and high-pressure water, and the precursor liquid or slurry stream and the supercritical liquid stream are introduced into a hydrothermal synthesis reactor to undergo hydrothermal reaction and an inorganic slurry, which is a reaction product, is discharged.

An inorganic material of the inorganic slurry is not particularly limited so long as the inorganic material may be prepared using a hydrothermal method. For example, the inorganic material may be at least one selected from the group consisting of $Co_2O_3$, $Fe_2O_3$, $LiMn_2O_4$, $MO_x$ where M is Fe, Ni, Co, Mn, Al, or the like and x is a number satisfying electroneutrality, MOOH where M is Fe, Ni, Co, Mn, Al, or the like, and $A_aM_mX_xO_oS_sN_nF_f$ where A is at least one selected from the group consisting of Li, Na, K, Rb, Cs, Be, Mg, Ca, Sr, and Ba; M may contain at least one transition metal and optionally contain at least one selected from the group consisting of B, Al, Ga, and In; X is at least one selected from the group consisting of P, As, Si, Ge, Se, Te, and C; O is oxygen; S is sulfur; N is nitrogen; F is fluorine; and a, m, x, o, s, n, and f are each independently a number of 0 or more, satisfying electroneutrality.

Precursors of the inorganic materials may vary according to the type thereof and different precursors may be used for preparation of identical inorganic materials. Selection of suitable precursors according to desired application will be obvious to those skilled in the art. As a non-limiting example, when $Co_2O_3$ is prepared, cobalt nitrate ($Co(NO_3)_3$) or cobalt sulfate (($Co_2(SO_4)_3$) may be used as a precursor in preparation of $Co_2O_3$.

Preferably, the inorganic material is $Li_aM_bM'_cPO_4$ where M is at least one selected from the group consisting of Fe, Ni, Co, and Mn; M' is at least one selected from the group consisting of Ca, Ti, S, C, and Mg; and a, b, and c are each independently a number of 0 or more, satisfying electroneutrality and particularly preferably, $LiFePO_4$.

$LiFePO_4$ requires an iron precursor, a phosphorus precursor, a lithium precursor, and the like as precursors, and these precursors may be suitably selected according to desired application. For example, iron sulfate, phosphoric acid, lithium hydroxide, and the like may be used as precursors of $LiFePO_4$. More specifically, $LiFePO_4$ may be prepared by previously mixing an aqueous solution of iron sulfate and phosphoric acid with an aqueous solution of ammonia water and lithium hydroxide, introducing the mixture as a precursor liquid or slurry stream into a reactor, and reacting the mixture with high-temperature and high-pressure water.

In one exemplary embodiment, a material causing the clogging phenomenon may be $\gamma\text{-}Fe_2O_3$. According to confirmation by the inventors of the present invention, $\gamma\text{-}Fe_2O_3$ is produced according to Reaction Scheme 1 below:

$$Fe(OH)_2 + \tfrac{1}{4}O_2 \rightarrow \tfrac{1}{2}\gamma\text{-}Fe_2O_3 + H_2O \quad \text{(Reaction Scheme 1)}$$

$Fe(OH)_2$ is produced in precursor precipitation reaction for production of an intermediate when pH is high. $Fe(OH)_2$ has strong adhesive strength in a pipe and receives heat from a front end of a hydrothermal synthesis reactor, whereby $\gamma\text{-}Fe_2O_3$ may be formed according to Reaction Scheme 1 above.

In this regard, it is difficult to check pH inside or at the front end of the reactor and thus pH of a filtrate is measured. The filtrate may have a pH of 3.5 to 9.5. When the pH of the filtrate is less than 3.5, the clogging phenomenon may be further reduced as the filtrate becomes more acidic while a reaction product contains more impurities. On the other hand, when the pH of the filtrate exceeds 9.5, the amount of $Fe(OH)_2$ increases in the precursor liquid or slurry stream and thus $\gamma\text{-}Fe_2O_3$ is formed and, accordingly, the clogging phenomenon is worsened. For this reason, the pH of the filtrate may be between 4 and 9.

In particular, such a clogging phenomenon mainly occurs at a front end portion of a main mixer and thus urea may be added as the reaction precursor instead of ammonia water. Particularly, when urea is added instead of ammonia water, the front end portion of the main mixer may be kept acidic, and the added urea forms $NH_3$ in supercritical water atmosphere and thus a rear end portion of the main mixer may be kept neutral or basic, which results in improved purity of inorganic particles (i.e., $LiFePO_4$). A mechanism for formation of $NH_3$ from urea is represented by Reaction Scheme 2 below.

$$(NH_2)_2CO + H_2O \rightarrow 2NH_3 + CO_2 \quad \text{(Reaction Scheme 2)}$$

In one exemplary embodiment, the main mixer may be further provided at a front end thereof with a refrigerator. Thus, a temperature of the front end of the main mixer may be minimized and heat transfer from the main mixer to a pre-mixer may be prevented and, accordingly, decomposition of urea at the front end of the main mixer may be prevented.

In some embodiments, a pre-mixer for preparing a precursor to provide the precursor liquid or slurry stream may be further added.

In one exemplary embodiment, an injection direction of the precursor liquid or slurry stream into the reactor may form an angle of 0° to 60° based on a discharge direction of an inorganic slurry stream including the inorganic slurry.

The term "supercritical liquid stream" as used herein refers to a liquid stream containing high-temperature and high-pressure water, regardless of the name thereof.

According to the present invention, by setting conditions such that the injection direction of the precursor liquid or slurry stream into the reactor satisfies the above-described angle ranges with respect to the discharge direction of the inorganic slurry stream, a clogging phenomenon, conventionally occurring around an inlet when a precursor liquid stream is discharged at 90° based on an injection direction thereof, may be further suppressed.

For this reason, more preferably, the injection direction of the precursor liquid or slurry stream forms an angle of 0° to 45° based on the discharge direction of the inorganic slurry stream including the inorganic slurry.

In a conventional device, due to occurrence of the clogging phenomenon as described above, inclusion of a relatively large amount of a supercritical liquid stream in an inorganic slurry stream is required to suppress the clogging phenomenon.

On the other hand, according to the present invention, this problem can be resolved. Thus, the amount of the inorganic material of the inorganic slurry may be 0.05 wt % to 5 wt %.

Preferably, a ratio of flow rates per hour of the precursor liquid or slurry stream and the supercritical liquid stream may be 1:2 to 1:50 (precursor liquid or slurry stream: supercritical liquid stream) on a weight ratio basis.

When the ratio of flow rates is less than 1:2, the amount of the supercritical liquid stream is insufficient and thus it may be difficult to perform hydrothermal synthesis reaction at a high yield. On the other hand, when the ratio of flow rates exceeds 1:50, an increase in cost is caused by increase in size of the device and the amount of the inorganic material in the inorganic slurry is reduced, which results in reduced productivity.

These conditions optimize hydrothermal synthesis and may be changed according to various process conditions such as precursors, inorganic materials, and production efficiency.

The supercritical liquid stream may, for example, contain high-temperature and high-pressure water having a temperature of 100° C. to 700° C. and a pressure of 10 to 550 bar. More preferably, the supercritical liquid stream contains supercritical water having a temperature of 374° C. to 700° C. and a pressure of 221 to 550 bar or subcritical water having similar temperature and pressure to the supercritical water. Meanwhile, when supercritical water is used, temperature and pressure may be arbitrarily set, but may be set to 700° C. or less and 550 bar or less in consideration of equipment and reaction control.

In one exemplary embodiment, the supercritical liquid stream introduced into the main mixer may include at least one supercritical liquid stream, more preferably at least two supercritical liquid streams. When at least two supercritical liquid streams are used, inlet positions and angles of the supercritical liquid streams in the main mixer may each independently be freely selected. Preferably, the two or more supercritical liquid streams may have opposite injection directions.

For example, the supercritical liquid stream may include a first supercritical liquid stream and a second supercritical liquid stream. In this case, an injection direction of the first supercritical liquid stream and an injection direction of the second supercritical liquid stream may be controlled within a suitable range, since reaction atmosphere such as reaction time may be controlled according to angles of the injection directions. That is, the angle may be adjusted within an angle of greater than 0° to less than 180° based on the discharge direction of the inorganic slurry stream in order to achieve desired reaction atmosphere. Preferably, the angle may be 10° to 170° based on the discharge direction of the inorganic slurry stream. When the angle of the injection direction of the supercritical liquid stream is less than 10° based on the discharge direction of the inorganic slurry stream, reaction is not smoothly implemented and the inorganic slurry stream may be immediately discharged. On the other hand, when the angle of the injection direction of the supercritical liquid stream exceeds 170°, reverse current may occur in the reactor due to high pressure of the supercritical liquid stream. For this reason, the angle of the injection direction of the supercritical liquid stream is more preferably between 20° and 160° based on the discharge direction of the inorganic slurry stream.

In a case in which the size of the reactor is small, in particular, the height of the reactor is low, when the angle of the injection direction of the supercritical liquid stream exceeds 90° based on the discharge direction of the inorganic slurry stream, the supercritical liquid stream has a speed in an opposite direction to the discharge direction of the inorganic slurry stream, and thus, reaction may occur near an inlet of the precursor liquid or slurry stream. In this case, the inlet of the precursor liquid or slurry stream may be more easily clogged. Accordingly, the angle may be suitably set in consideration of factors such as reactor size.

As described above, the injection direction of the precursor liquid or slurry stream into the reactor may form an angle of 0° to 60° based on the discharge direction of the inorganic slurry stream, and the angle range is preferably 0° to 45°, more preferably 0° to 30°, particularly preferably 0° to 20°. Of these, a structure in which the angle is 0°, that is, a structure in which the injection direction of the precursor liquid or slurry stream and the discharge direction of the inorganic slurry stream are arranged in a straight line, is most preferable.

The present invention also provides an inorganic slurry prepared using the method described above and an inorganic material prepared by drying and calcining the inorganic slurry.

The inorganic material obtained by drying and calcining the inorganic slurry may be use in various applications according to the type thereof. In one exemplary embodiment, the inorganic material may be used as a cathode active material for secondary batteries.

A secondary battery using the inorganic material as a cathode active material includes a cathode, an anode, a separator, and a lithium salt-containing non-aqueous electrolyte.

The cathode may be prepared by mixing a cathode mixture with a solvent such as NMP or the like to prepare a slurry, coating the slurry on a cathode current collector, and drying and rolling the coated cathode current collector.

The cathode mixture includes the inorganic material prepared using the device as a cathode active material and may optionally include a conductive material, a binder, a filler, or the like.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 30 wt % based on the total weight of the mixture including the cathode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The anode may be manufactured by coating an anode mixture including an anode active material on an anode current collector and drying the coated anode current collector. As desired, the anode mixture may include the above-described components such as a conductive material, a binder, a filler, and the like.

The anode current collector is generally fabricated to a thickness of 3 μm to 500 μm. The anode current collector is not particularly limited so long as it does not cause chemical changes in the fabricated secondary battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, without being limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, without being limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas.

The secondary battery may be used in a battery cell used as a power source for small devices and also may be used as a unit battery for medium and large-scale battery modules including a plurality of battery cells used as a power source of medium and large-scale devices which require stability at high temperature, long cycle lifespan, and high rate.

Examples of medium and large-scale devices include, without being limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; and electric golf carts.

Effects of the Invention

As described above, according to the present invention, clogging of an inlet of a liquid stream may be minimized and thus a continuous driving time is increased, which results in significantly increased manufacturing productivity and reduced investment costs.

BRIEF DESCRIPTION OF THE DRAWINGS

The above and other objects, features and other advantages of the present invention will be more clearly understood from the following detailed description taken in conjunction with the accompanying drawing, in which.

BEST MODE

Now, the present invention will be described in more detail with reference to the following examples. These examples are provided only for illustration of the present invention and should not be construed as limiting the scope and spirit of the present invention.

According to the present invention, first, LiOH as a Li precursor, $FeSO_4$ as an Fe precursor, and $H_3PO_4$ as a P precursor are mixed in a pre-mixer $M_1$, hydrothermal synthesis reaction thereamong occurs in a hydrothermal synthesis reactor $M_2$, and a reaction product is obtained via filtration after a cooling process. In these processes, supercritical water having a high temperature and a high pressure participates in reaction prior to the filtering process and thus it is very difficult to measure pH. Thus, pH of the filtrate may be measured and adjusted to control clogging occurring in the manufacturing processes.

Figure 1:
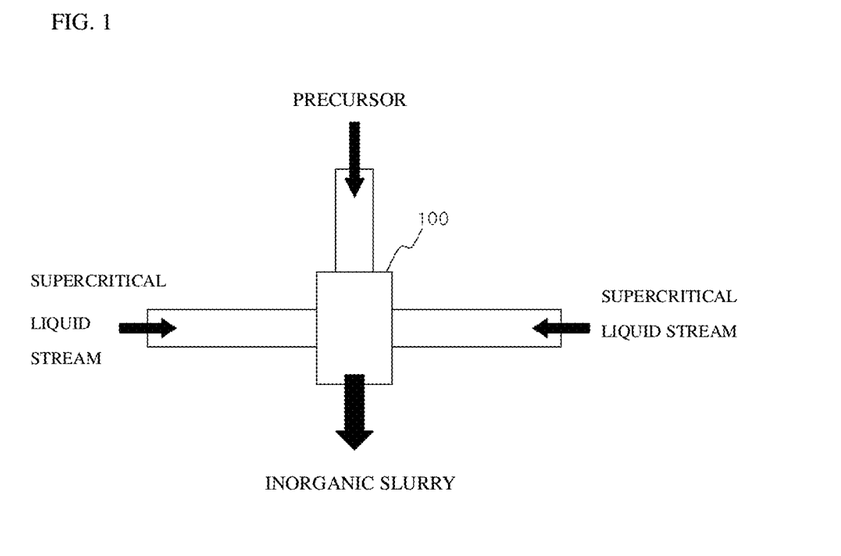
FIG. 1 is a schematic view of a hydrothermal synthesis device according to an embodiment of the present invention.
Figure 2:
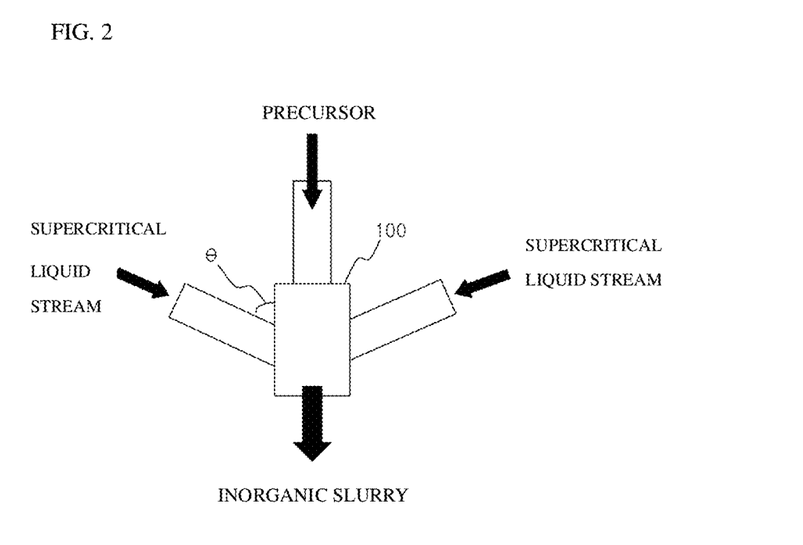
FIG. 2 is a schematic view of a hydrothermal synthesis device according to another embodiment of the present invention.

FIG. 1 is a schematic view of a hydrothermal synthesis device according to an embodiment of the present invention. FIG. 2 is a schematic view of a hydrothermal synthesis device according to another embodiment of the present invention.

Referring to FIG. 1, a precursor liquid or slurry stream is introduced into a hydrothermal synthesis reactor 100 in a direction substantially the same as a discharge direction of an inorganic slurry stream and supercritical liquid streams facing each other are introduced from opposite sides into the reactor 100 in a direction perpendicular to the injection direction of the precursor liquid or slurry stream.

In addition, referring to FIG. 2, a precursor liquid or slurry stream is introduced into a hydrothermal synthesis reactor 100 in a direction substantially the same as a discharge direction of an inorganic slurry stream and supercritical liquid streams facing each other are introduced from opposite sides at a predetermined angle θ with respect to the discharge direction of the inorganic slurry stream. The angle θ may be appropriately adjusted within greater than 0 to less than 180 degrees with respect to the discharge direction of the inorganic slurry stream, according to desired reaction atmosphere.

Referring to FIGS. 1 and 2, since the injection direction of the precursor liquid or slurry stream and the discharge direction of the inorganic slurry stream are substantially arranged in a straight line, the precursor liquid or slurry stream considerably maintaining the injection direction reacts with the supercritical stream and an inorganic slurry is thus discharged as a reaction product. Thus, high resistance is not applied near an inlet and a phenomenon in which the edge of the inlet begins to clog may be reduced. Consequently, such configuration may help adjust pH and minimize clogging of the inlet. In addition, in the process of introducing the precursor liquid or slurry stream into the reactor, there is almost no loss of movement in the preceding direction and the amount of the inorganic material in the reaction product is larger than that of a conventional device.

Figure 3:
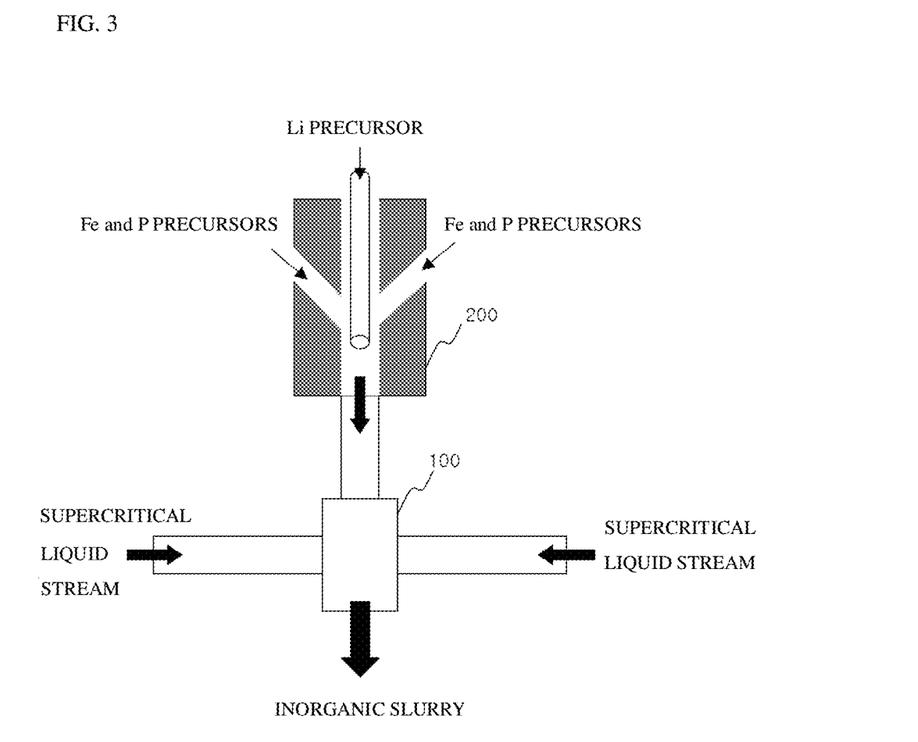
FIGS. 3 and 4 are schematic views illustrating a structure of a hydrothermal synthesis device further including a pre-mixer according to another embodiment of the present invention.
Figure 4:
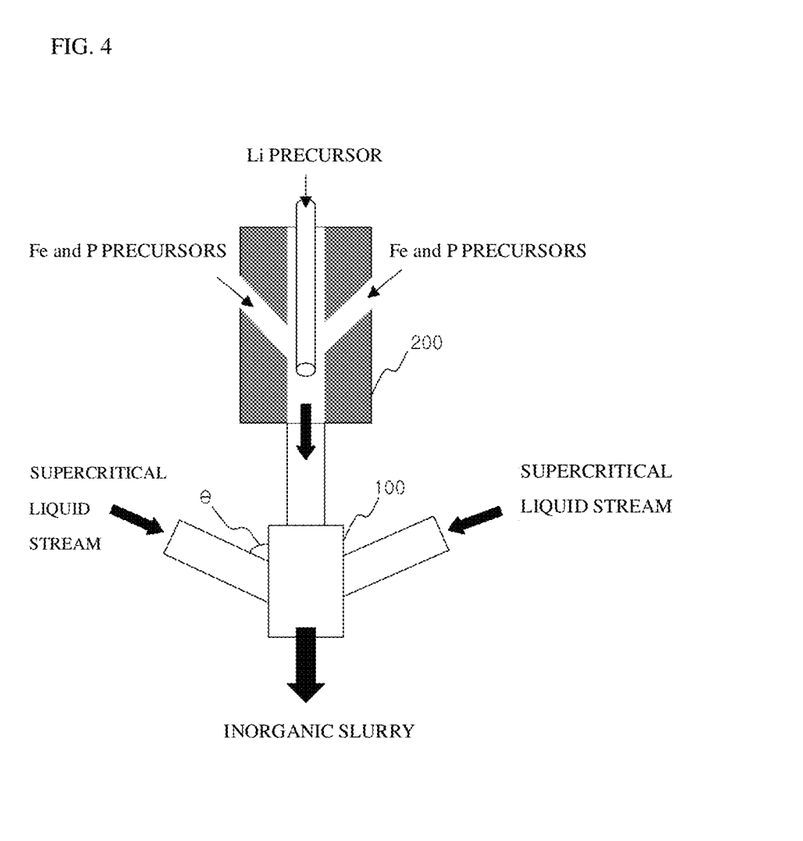

FIGS. 3 and 4 are schematic views illustrating a structure of a hydrothermal synthesis device further including a pre-mixer according to another embodiment of the present invention.

Referring to FIGS. 3 and 4, in another embodiment, a structure of a hydrothermal synthesis device further including a pre-mixer 200 is schematically shown. The present hydrothermal synthesis device has the same basic configuration as that of the devices illustrated in FIGS. 1 and 2, but is different therefrom in that the present hydrothermal synthesis device further includes the pre-mixer 200 for preparing the precursor liquid or slurry stream.

This device prepares a $LiFePO_4$ inorganic slurry, for example, by mixing a Li precursor, an Fe precursor, a P precursor, and $NH_3$ in the pre-mixer 200, introducing a precursor liquid or slurry stream obtained therefrom into a reactor, and performing the reaction described with reference to FIGS. 1 and 2.

Hereinafter, the present invention will be described in more detail with reference to the following examples. These examples are provided for illustrative purposes only and should not be construed as limiting the scope and spirit of the present invention.

EXAMPLE 1

481 g of $LiOH-H_2O$, 258 g of urea, and 8270 g of distilled water were mixed and dissolved to prepare aqueous solution A. Similarly, 1581 g of $FeSO_4\text{-}7H_2O$, 159 g of sucrose, 661 g of phosphoric acid (85 wt %), and 6640 g of distilled water were mixed and dissolved to prepare aqueous solution B. Subsequently, supercritical water having a pressure of 250 bar and a temperature of 450° C. flowed into a continuous tube-type reactor at a flow rate of 100 g/min under increased temperature and pressure conditions and each of the aqueous solutions A and B flowed thereinto at a flow rate of 15 g/min so as to contact the supercritical water for several seconds and be mixed therewith to induce reaction therebetween. In this regard, reaction occurs such that the aqueous solutions A and B contact to prepare a slurry and then the slurry contacts the supercritical water.

The prepared $LiFePO_4$ reaction slurry was cooled and filtered at an edge portion of the tube-type reactor to obtain a concentrated $LiFePO_4$ slurry. In this regard, pH of the filtrate was 7.8 in a normal state. 7 hours after reaction, a difference (P1–P3) between a pressure P3 of a supercritical water tube and a pressure P1 of a raw material injection tube was 0 bar, from which it was confirmed that there was no clogging phenomenon.

Thereafter, the concentration of water in the slurry was adjusted to prepare a slurry containing a solid content of 15 wt %, and sucrose was added thereto in an amount of 15 wt % based on the weight of the solid content and dissolved therein. The obtained slurry was spray-dried to obtain a sucrose-coated $LiFePO_4$ powder.

The prepared powder was heat-treated at about 700° C. for 10 hours in nitrogen atmosphere to finally obtain a carbon-coated $LiFePO_4$ powder. As a result of XRD/Rietveld analysis, it was confirmed that the carbon-coated $LiFePO_4$ powder had a pure $LiFePO_4$ crystal structure.

EXAMPLE 2

A $LiFePO_4$ slurry was prepared in the same manner as in Example 1, except that 474 g of $LiOH-H_2O$, 180 g of urea, and 8350 g of distilled water were mixed and dissolved to prepare aqueous solution A.

In this regard, pH of the filtrate was 5.8 in a normal state. 7 hours after reaction, the difference (P1–P3) between the pressure P3 of the supercritical water tube and the pressure P1 of the raw material injection tube was 0 bar, from which it was confirmed that there was no clogging phenomenon.

Thereafter, the concentration of water in the slurry was adjusted to prepare a slurry containing a solid content of 15 wt %, and sucrose was added thereto in an amount of 15 wt % based on the weight of the solid content and dissolved therein. The obtained slurry was spray-dried to obtain a sucrose-coated $LiFePO_4$ powder.

The prepared powder was heat-treated at about 700° C. for 10 hours in nitrogen atmosphere to finally obtain a carbon-coated $LiFePO_4$ powder. As a result of XRD/Rietveld analysis, it was confirmed that the carbon-coated $LiFePO_4$ powder had a pure $LiFePO_4$ crystal structure.

Comparative Example 1

A $LiFePO_4$ slurry was prepared in the same manner as in Example 1, except that 601 g of $LiOH-H_2O$, 519 g of ammonia water (29 wt %), and 7890 g of distilled water were mixed and dissolved to prepare aqueous solution A.

In this regard, pH of the filtrate was 9.8 in a normal state. 7 hours after reaction, the difference (P1–P3) between the pressure P3 of the supercritical water tube and the pressure P1 of the raw material injection tube was 12 bar, from which it was confirmed that clogging severely occurred.

Thereafter, the concentration of water in the slurry was adjusted to prepare a slurry containing a solid content of 15 wt %, and sucrose was added thereto in an amount of 15 wt % based on the weight of the solid content and dissolved therein. The obtained slurry was spray-dried to obtain a sucrose-coated $LiFePO_4$ powder.

The prepared powder was heat-treated at about 700° C. for 10 hours in nitrogen atmosphere to finally obtain a carbon-coated $LiFePO_4$ powder. As a result of XRD/Rietveld analysis, it was confirmed that approximately 10 wt % of $Fe_2O_3$ (maghemite) phase in addition to the $LiFePO_4$ phase was present.

Comparative Example 2

A $LiFePO_4$ slurry was prepared in the same manner as in Example 1, except that 474 g of $LiOH-H_2O$, 347 g of urea, and 8175 g of distilled water were mixed and dissolved to prepare aqueous solution A.

In this regard, pH of the filtrate was 10.1 in a normal state. 7 hours after reaction, the difference (P1–P3) between the pressure P3 of the supercritical water tube and the pressure P1 of the raw material injection tube was 14 bar, from which it was confirmed that clogging severely occurred.

Thereafter, the concentration of water in the slurry was adjusted to prepare a slurry containing a solid content of 15 wt %, and sucrose was added thereto in an amount of 15 wt % based on the weight of the solid content and dissolved therein. The obtained slurry was spray-dried to obtain a sucrose-coated $LiFePO_4$ powder.

The prepared powder was heat-treated at about 700° C. for 10 hours in nitrogen atmosphere to finally obtain a carbon-coated $LiFePO_4$ powder. As a result of XRD/Rietveld analysis, it was confirmed that approximately 10 wt % of $Fe_2O_3$ (maghemite) phase in addition to the $LiFePO_4$ phase was present.

Comparative Example 3

A $LiFePO_4$ slurry was prepared in the same manner as in Example 1, except that 415 g of $LiOH-H_2O$, 159 g of urea, and 8425 g of distilled water were mixed and dissolved to prepare aqueous solution A.

In this regard, pH of the filtrate was 3.3 in a normal state. 7 hours after reaction, the difference (P1–P3) between the pressure P3 of the supercritical water tube and the pressure P1 of the raw material injection tube was 0 bar, from which it was confirmed that there was no clogging phenomenon.

Thereafter, the concentration of water in the slurry was adjusted to prepare a slurry containing a solid content of 15 wt %, and sucrose was added thereto in an amount of 15 wt % based on the weight of the solid content and dissolved therein. The obtained slurry was spray-dried to obtain a sucrose-coated $LiFePO_4$ powder.

The prepared powder was heat-treated at about 700° C. for 10 hours in nitrogen atmosphere to finally obtain a carbon-coated $LiFePO_4$ powder. As a result of XRD/Rietveld analysis, it was confirmed that a considerable amount of other impurities in addition to the $LiFePO_4$ phase were present.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preparing inorganic particles using a hydrothermal synthesis device, the method comprising:
introducing a precursor liquid or slurry stream comprising a reaction precursor for preparation of an inorganic material into a hydrothermal synthesis reactor;
introducing at least one supercritical liquid stream comprising high temperature and high pressure water into the hydrothermal synthesis reactor;
preparing an inorganic slurry by hydrothermal reaction in the hydrothermal synthesis reactor and discharging the inorganic slurry therefrom; and
filtering the discharged inorganic slurry to obtain a filtrate, wherein the precursor liquid or slurry stream comprises an $NH_3$ source at the high temperature of the supercritical liquid stream and the $NH_3$ source adjusts the pH of the inorganic slurry to within a range of 3.5 to 8 to inhibit clogging of the stream in the hydrothermal synthesis reactor.

2. The method according to claim 1, wherein the hydrothermal synthesis device comprises a structure in which a precursor liquid or slurry stream containing a precursor for preparation of an inorganic material is included, and a supercritical liquid stream containing high-temperature and high-pressure water is included, and the precursor liquid or slurry stream and the supercritical liquid stream are introduced into the hydrothermal synthesis reactor to undergo hydrothermal reaction and an inorganic slurry as a reaction product is discharged therefrom.

3. The method according to claim 1, wherein an inorganic material of the inorganic slurry is at least one selected from the group consisting of $CO_2O_3$, $Fe_2O_3$, $LiMn_2O_4$, $MO_x$ where M is Fe, Ni, Co, Mn, or Al and x is a number satisfying electroneutrality, MOOH where M is at least one selected from the group consisting of Fe, Ni, Co, Mn, and Al, and $A_aM_mX_xO_oS_sN_nF_f$ where A is at least one selected from the group consisting of Li, Na, K, Rb, Cs, Be, Mg, Ca, Sr, and Ba; M comprises at least one transition metal and optionally comprises at least one selected from the group consisting of B, Al, Ga, and In; X is at least one selected from the group consisting of P, As, Si, Ge, Se, Te, and C; O is oxygen; S is sulfur; N is nitrogen; F is fluorine; and a, m, x, o, s, n, and f are each independently a number of 0 or more, satisfying electroneutrality.

4. The method according to claim 3, wherein the inorganic material is $Li_aM_bM'_cPO_4$ where M is at least one selected from the group consisting of Fe, Ni, Co, and Mn; M' is at least one selected from the group consisting of Ca, Ti, S, C, and Mg; and a, b, and c are each independently a number of 0 or more, satisfying electroneutrality.

5. The method according to claim 4, wherein the inorganic material is $LiFePO_4$.

6. The method according to claim 1, wherein a material causing the clogging is $\gamma$-$Fe_2O_3$.

7. The method according to claim 1, wherein the $NH_3$ source is urea.

8. The method according to claim 1, wherein the hydrothermal synthesis device further comprises a pre-mixer for preparation of a precursor to provide the precursor liquid or slurry stream.

9. The method according to claim 1, wherein an injection direction of the precursor liquid or slurry stream into the reactor forms an angle of 0° to 60° based on a discharge direction of an inorganic slurry stream comprising the inorganic slurry.

10. The method according to claim 9, wherein the injection direction of the precursor liquid or slurry stream forms an angle of 0° to 45° based on the discharge direction of the inorganic slurry stream comprising the inorganic slurry.

11. The method according to claim 1, wherein a ratio of flow rates per hour of the precursor liquid or slurry stream and the supercritical liquid stream is 1:2 to 1:50 (precursor liquid or slurry stream: supercritical liquid stream) on a weight ratio basis.

12. The method according to claim 1, wherein the supercritical liquid stream comprising high-temperature and high-pressure water has a temperature of 100° C. to 700° C. and a pressure of 10 to 550 bar.

13. The method according to claim 1, wherein the introducing at least one supercritical liquid stream comprising high temperature and high pressure water into the hydrothermal synthesis reactor comprises:
   introducing a first supercritical liquid stream in a first injection direction; and
   introducing a second supercritical liquid stream in a second injection direction.

14. The method according to claim 13, wherein the first injection direction is facing the second injection direction with respect to an injection direction of the precursor liquid or slurry stream.

15. The method according to claim 13, wherein the first and second injection directions of the first supercritical liquid stream and the second supercritical liquid stream forms an angle of greater than 0° to less than 180° based on a discharge direction of the inorganic slurry stream.

16. The method according to claim 15, wherein each injection direction forms an angle of 10° to 170° based on the discharge direction of the inorganic slurry stream.

17. The method according to claim 1, wherein an injection direction of the precursor liquid or slurry stream and a discharge direction of the inorganic slurry stream are arranged in a straight line.

18. The method according to claim 1, wherein an injection direction of the precursor liquid or slurry stream and a discharge direction of an inorganic slurry stream are not arranged in a straight line.

19. An inorganic slurry prepared using the method according to claim 1.

20. An inorganic material obtained by drying the inorganic slurry according to claim 19.

21. The inorganic material according to claim 20, wherein the inorganic material is used as a cathode active material for a secondary battery.

22. A method of preparing inorganic particles using a hydrothermal synthesis device, the method comprising:
   introducing a precursor liquid or slurry stream comprising LiOH, $FeSO_4$, phosphoric acid and an NH3 source
   introducing at least one supercritical liquid stream comprising high-temperature and high-pressure water into the hydrothermal synthesis reactor;
   preparing an inorganic slurry by hydrothermal reaction in the hydrothermal synthesis reactor and discharging the inorganic slurry therefrom; and
   filtering the discharged inorganic slurry;
   adding sucrose to the filtered discharged inorganic slurry;
   spray-drying the filtered discharged inorganic slurry to obtain a sucrose-coated LiFePO4 powder;
   heat treating the sucrose-coated powder to obtain carbon-coated $LiFePO_4$ that has a substantially pure $LiFePO_4$ crystal structure;
   wherein the $NH_3$ source is at a high temperature of the supercritical liquid stream and adjusts the slurry to a pH between 4 and 9.

23. The method according to claim 1, wherein the $NH_3$ source adjusts the pH of the inorganic slurry to within a range of 3.5 to 7.8.

* * * * *